(12) United States Patent
Luan et al.

(10) Patent No.: US 9,790,093 B2
(45) Date of Patent: Oct. 17, 2017

(54) HIGH-YIELD SYNTHESIS OF NANOSTRUCTURED BORON PHOSPHIDE BY A PYROTECHNIC METHOD

(71) Applicant: The United States of America as Represented by the Secretary of the Army, Washington, DC (US)

(72) Inventors: Zhaohua Luan, Roxbury, NJ (US); Lauren A. Morris, Midland Park, NJ (US); Anthony P. Shaw, Madison, NJ (US); Christopher D. Haines, Union, NJ (US); Jay C. Poret, Sparta, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 12 days.

(21) Appl. No.: 15/000,593

(22) Filed: Jan. 19, 2016

(65) Prior Publication Data
US 2017/0203965 A1   Jul. 20, 2017

(51) Int. Cl.
*C01B 25/08* (2006.01)
(52) U.S. Cl.
CPC ................................. *C01B 25/084* (2013.01)
(58) Field of Classification Search
None
See application file for complete search history.

(56) References Cited

U.S. PATENT DOCUMENTS 3,395,986 A   8/1968   Gruber

FOREIGN PATENT DOCUMENTS

| FR | EP 2886515 A1 * | 6/2015 | ........... C01B 25/084 |
| WO | WO 2015/097244 | 7/2015 | |

OTHER PUBLICATIONS

Solozhenko et al. (Self-Propagating High-Tmeperature Synthesis of Boron Phosphide; Journal of Superhard Materials 6.35; 415-417; 2013.*
Mukhanov V.A., et al., Self-Propagating High-Temperature Synthesis of Boron Phosphide, Journal of Superhard Materials, 2013, 415-417, vol. 35, Aillerton Press, Inc., Sverkhtverdye Materialy.
Solozhenko, Vladimir, et al., Boron Phosphide Under Pressure: In Situ Study by Raman Scattering and X-Ray Diffraction, Journal of Applied Physics, 2014, pp. 033501-1-5, vol. 116, AIP Publishing LLC.
Shaw, Anthony et al., Versatile Boron Carbide-Based Visual Obscurant Compositions for Smoke Munitions, ACS Sustainable Chemistry Engineering, 2015, pp. 1248-1254, vol. 3, American Chemical Society.

(Continued)

*Primary Examiner* — Guinever S Gregorio
(74) *Attorney, Agent, or Firm* — Lisa H. Wang (57) ABSTRACT

A simplified method for synthesizing boron phosphide at high yields. The method requires mixing of boron phosphate and magnesium metal without diluents into a homogenous mixture, loosely packing the mixture at less than 20,000 psi and igniting the mixture using an energy input that is not greater than 20% of the reaction energy output to create a self-propagating high-temperature reaction wherein the boron phosphate and magnesium metal is completely burned during the reaction to synthesize boron phosphide at high yields.

14 Claims, 4 Drawing Sheets

(56) References Cited

OTHER PUBLICATIONS

Shaw, Anthony et al., Demonstration of the B4C/NaIO4/PTFE Delay in the U.S. Army Hand-Held Signal, ACS Sustainable Chemistry, 2015, pp. 1558-1563, vol. 3, American Chemical Society.
T.P. Goddard, High Deflagration Rate Igniter Technology Applications Final Report, BDM Corporation, May 15, 1980, DTIC.
Hebert Ellern, Military and Civilian Pyrotechnics, Chemical Publishing Company, Inc., New York, 1968.
Raymond Comyn, Pyrotechnic Research at DOFL, Part II, Pyrotechnic Delay, Department of the Army, Feb. 16, 1952.

* cited by examiner

HIGH-YIELD SYNTHESIS OF NANOSTRUCTURED BORON PHOSPHIDE BY A PYROTECHNIC METHOD

RIGHTS OF THE GOVERNMENT

The inventions described herein may be manufactured and used by or for the United States Government for government purposes without payment of any royalties.

FIELD OF INVENTION

This invention relates to production of boron phosphide. More specifically, this invention relates to high yield synthesis of boron phosphide in a self-propagating high-temperature synthesis reaction by combining boron phosphate and magnesium metal without the need for diluents into a homogenous mixture, loosely packing the mixture, and then igniting the mixture with a minimum amount of energy that can be supplied by a pyrotechnic igniter.

BACKGROUND OF THE INVENTION

Boron phosphide (BP) is a lightweight compound with significant hardness, and is thermally stable and extremely corrosion-resistant against strong reagents. BP is ill-understood in terms of its unique properties. For example, BP is lightweight but extremely hard, and resistant to strong corrosive reagents, however, these properties have not yet been exploited in any potential applications. In addition, there is a growing interest in recent years in using so-called "ceramic-type" materials, such as fine boron carbide or silicon carbide powder, as environmentally benign fuels in pyrotechnic formulations for their long lasting and controllable burning characteristics.

Long regarded as a promising III-V compound semiconductor, boron phosphide (BP) is characterized by a wide indirect band gap of 2.0 eV along with high electron and hole mobility at elevated temperatures. Both n-type (with an excess of phosphorus) and p-type (with an excess of boron) BP semiconductors are being studied, and a number of BP-based optoelectronic and thermoelectric devices, such as Schottky barriers, metal-insulator-semiconductor (MIS) junctions, and p-n electroluminescent junctions, have since been fabricated. BP microcrystals are also being considered as potential heat-sink substrates for semiconductor devices owing to their high thermal conductivity comparable to that of boron nitride. Their potential application in solid-state neutron detectors, due to the large thermal neutron capture cross-section of the boron-10 isotope, has been reported. As a refractory material with a high refractive index of 3.0 at around 0.63 µm in the visible spectrum, its use in high temperature luminescent devices has been explored in the past as well.

Finely powdered boron carbide was recently proposed and demonstrated as an environmentally benign alternative to the toxic chemicals in a variety of pyrotechnic compositions including those for smoke production and time delay fuzes (Shaw, Diviacchi, et al. 2015; Shaw, Poret, et al. 2015). Microcrystalline BP is a potentially useful fuel for pyrotechnic compositions, especially those intended for smoke production, because of its high phosphorus content (74 percent by weight). Elemental phosphorus has been used for many years in high-performance smoke munitions. The unique properties of BP, along with its potential as an environmentally benign fuel in pyrotechnic formulations, however, have not yet been exploited because of the lack of a safe and economically feasible process for its large-scale production.

Synthesis of boron phosphide typically requires use of toxic components or complex processes that are unsafe and expensive. The first syntheses of BP from boron halides ($BBr_3$ or $BI_3$) and phosphine ($PH_3$) or white phosphorus ($P_4$) were reported in 1891. Since then, many other precursor chemicals, such as elemental boron, triethylborane ($B(C_2H_5)_3$), diborane ($B_2H_6$) for boron and white phosphorus ($P_4$), phosphorus halides ($PCl_3$ or $PCl_5$), aluminum phosphide (AlP), zinc phosphide ($Zn_3P_2$) for phosphorus, etc., have been used as source materials for BP synthesis. Typically, a precursor mixture is heated in a sealed tube to a high temperature or dropped directly into a superheated reaction zone in excess of 1000° C. The approach has been adopted reasonably well in the laboratory as a chemical vapor deposition (CVD) process to grow BP epitaxial layers on various supporting substrates, but the use of highly toxic and flammable reagents at high temperatures presents a significant challenge for any of those processes to be implemented safely and economically in a large-scale operation. A so-called solvothermal method was recently introduced to synthesize BP nanocrystals from boron powder and phosphorus trichloride in a sealed autoclave with benzene as the solvent. The synthesis was performed at a relatively lower temperature of about 350° C., in which the nascent phosphorus precursor was actually produced by reduction of the trichloride with metallic lithium or sodium.

Most recently, V. A. Mukhanov et al., reported a simplified process for "Self-Propagating High-Temperature Synthesis of Boron Phosphide". This process employs a self-propagating high-temperature synthesis (SHS), to synthesize BP microcrystal particles from a highly consolidated pellet made of readily available boron phosphate ($BPO_4$) and magnesium powders. The reaction, in which boron phosphate functions as an oxidizer for the oxidization of magnesium to magnesium oxide (MgO) while it is reduced to BP, is highly exothermic. Mukhanov described mixing fine boron phosphate and magnesium powders at a 1.0/4.1 molar ratio, and pressing the mixture at an extraordinarily high pressure of 0.6 GPa into a pellet 40 mm in diameter and 20 mm in length. The very high pressure specified for the pressing step corresponds to the application of 169,520 lbs-force (considering the diameter of 40 mm). The pellet was then heated with the flame of a gas burner to initiate the reaction, but the product of the reaction, however, was found to contain a significant amount (up to 30%) of the impurity boron subphosphide ($B_{12}P_2$). It was suggested that the impurity arose from immediate decomposition of the as-synthesized BP microcrystals due to an unexpected high reaction temperature of over 1227° C. The addition of sodium chloride into the mixture as a chemically inert diluent was shown to be necessary to reduce the reaction temperature and decrease the level of impurity. However, the incorporation of diluents can make SHS synthesis pellets difficult to ignite. Additionally, it was reported that the incorporation of sodium chloride can cause incomplete combustion of the synthesis pellets, resulting in decreased yields of BP. Mukhanov reported a yield of about 35% with respect to the theoretical maximum yield of BP, considering the reaction stoichiometry. With respect to the total mass of the starting materials, including the sodium chloride diluent, the reported yield of BP was even lower, less than 4%.

Thus, a need exists for a simplified process for producing boron phosphide in higher yields and with reduced amounts of impurities.

SUMMARY OF THE INVENTION

Boron phosphide is lightweight, hard, thermally stable, and corrosion resistant; these properties make it ideal for use in the semiconductor industry or in pyrotechnics. Many of the methods utilized for producing boron phosphide require complex steps using toxic materials or high levels of energy input to drive the synthesis reaction. A simplified method for producing boron phosphide using boron phosphate and magnesium metal in a self-propagating high-temperature synthesis reaction (SHS) was reported, however, the process produces high amounts of impurities, low yields of boron phosphide, or both.

The present invention is an improvement over the reported SHS method by disclosing a process for synthesizing boron phosphide in high yield where boron phosphate and magnesium metal are combined into a homogenous mixture without the need for temperature-controlling diluents, loosely packing the mixture at a pressure of 0 to 20,000 psi, and igniting the mixture using minimum energy input to create a SHS reaction that produces boron phosphide.

BRIEF DESCRIPTION OF THE DRAWINGS

Further features and advantages of the present invention may be understood from the drawings.

DETAILED DESCRIPTION

Disclosed herein is a simplified and improved method for BP synthesis. Specifically, the synthesis is performed by a pyrotechnic method, in which an SHTS reaction between boron phosphate and magnesium metal particles is initiated with a limited amount of energy input and sustained by its own heat output of about 1050 cal/g (4393 J/g). It has been discovered that by loosely packing the reactants in a column, other factors affecting the SHS synthesis of BP such as heat input and use of diluents to control temperature can be minimized to produce BP at high yields. The energy output from the reaction is sufficient enough to sustain a propagating combustion wave from one end of the mix column to the other despite the loose packing of the reactants.

To constitute a truly self-sustaining reaction as disclosed herein a mixture of fine boron phosphate and magnesium metal particles is loosely packed into a column with desirable cross-sectional characteristics. Pressure may be applied onto the column. Such applied pressure should not exceed 20,000 psi (most preferably, less than 10,000 psi) in order to produce a mixture that has low thermal conductivity. The column can be easily ignited remotely by any known arts of pyrotechnic means with a minimal energy input. As a thermal-dynamic process, the burning temperature of this SHS synthesis reaction is largely a function of the pressure with which the mix is pressed and thus the cross-section characteristics of the column prepared using that pressure, i.e. material packing density, which eventually determines the purity and yield of the resulting BP. For a loosely packed column of the mixture for BP synthesis, there is no need to use a diluting agent such as sodium chloride for temperature control purposes, a clear advantage over prior arts.

By definition, the SHS synthesis is a self-sustaining reaction initiated by point-heating of a small part of the materials, i.e. a minimum amount of energy input for initiation purposes only. Once started, an exothermic combustion wave sustains itself and sweeps progressively through the remaining body of the materials. The transfer of heat among reactant particles in an exothermic reaction is understandably a complex thermodynamic process with the simultaneous occurrence of possibly all heat transfer modes, i.e. conduction, convection, and radiation, although the last mode is usually less pronounced than the other two. Many SHS synthesis reactions involve solid reactants and products, although these materials may be present transiently as liquids due to the high temperatures involved. Gas production is usually minimal, and the primary mode of heat transfer within the reactant mixture is conduction. In this context, conduction is the transfer of heat between reactant particles (or liquid zones) and is largely a function of the thermal conductivity of the materials, the packing density of the mixture, and the local temperature gradient. Convection could also occur as a minor heat transfer mode in porous mixtures.

SHS synthesis of pellets as reported by Mukhanov was prepared by pressing the reactant powders at high pressures. These pellets are dense, relatively non-porous, and highly thermally conductive, especially when such pellets contain thermally conductive materials such as magnesium. These dense and thermally conductive pellets are difficult to ignite with a point-source of heat. Heat is rapidly transmitted by conduction throughout the body of such pellets which can delay the localized temperature increase required to achieve ignition. The amount of energy required to achieve reliable ignition can cause significant pre-heating of the entire reactant mixture. Once ignition finally occurs, heat produced by the reaction is also rapidly conducted throughout the mixture. Such rapid and efficient conductive heat transfer, the heat originating from both the ignition source and the synthesis reaction, can lead to high reaction temperatures and the production of reaction products that are not desired, including impurities. In fact, the high density and high thermal conductivity of the SHS synthesis pellets described by Mukhanov may have resulted in increased reaction temperatures that ultimately caused the formation of the $B_{12}P_2$ impurity, thereby necessitating the use of inert diluents such as sodium chloride to prevent the formation of that impurity. However, as previously described, the use of the sodium chloride diluent can make the synthesis pellets difficult to ignite, and reduces the yield of BP with respect to the total mass of the starting materials.

A stoichiometric mixture for BP synthesis contains approximately 50% magnesium and 50% boron phosphate by mass. The primary mode of heat transfer during the reaction, that sustains the self-propagating high-temperature synthesis, is conduction. A high-yield reaction for the synthesis of BP may be achieved by packing the magnesium and boron phosphate reactants loosely. Loose packing lowers the thermal conductivity of the mixture which reduces the rapidity and efficiency of heat transfer. In turn, this results in lower reaction temperatures and minimizes the formation of undesirable impurities such as $B_{12}P_2$. Notably, the addition of an inert diluent is not required, and the heat generated by the reaction is sufficient to sustain a self-propagating combustion wave, despite the reduced thermal conductivity of the mixture. Additionally, the lower thermal conductivity of the loosely-packed mixture makes it easier to ignite—application of a point-source of heat rapidly raises a localized area of the mixture to the ignition temperature.

The improved high yield synthesis of boron phosphide (BP) as disclosed herein starts with thoroughly mixing fine boron phosphate ($BPO_4$) and magnesium metal particles, in a mass ratio of 1.0+/−0.5 but most preferably 1.0+/−0.2, and then packed, with or without added pressure into a column of any shape and length. The mixture can be packed in a self-standing pellet form or a powderous column. The column can be composed of a tubular structure made of cardboard or other combustible material which can be eventually burnt off and completely removed after the synthesis. Alternatively, the column can be composed of ceramic, steel, carbonsteel, or any material that is structurally sound and thermally stable to survive a high reaction treatment in excess of 1000° C. If pressure is applied onto the homogenous mixture, it should not exceed 20,000 psi, most preferably, less than 10,000 psi, in order to produce a porous body of the mix with low thermal conductivity. The column can be easily ignited remotely via any known arts of pyrotechnic means with a minimum amount of energy input, such as a hot wire or an electric match with or without a secondary ignition mix such as a thin coating onto one end of the mix column. The amount of initiating energy (i.e. minimum energy input) that is applied to rapidly raise a localized area of the mixture to the ignition temperature could be fixed and would not depend on the synthesis batch size. A preferred non-limiting example of a fixed minimum energy input is 2.3 calories to 11.5 calories. Alternatively, the minimum energy input may be modified according to the scale of the homogenous mixture. Under such processing conditions, the minimum energy input can be based on a calorie input per weight of the pellet. Such minimum energy input, however, should not exceed about 20% of the heat output of the homogenous mixture (i.e. 218 calories/gram) preferably about 0.025% to about 20% of the heat output of the homogenous mixture.

The invented process for BP synthesis can be easily implemented with any known art of material processing technologies for large-scale industrial production. As an example, the precursor chemicals boron phosphate and magnesium metal particles can be mixed and compacted with a twin-screw extruder and transported continuously through a tubular column into a combustion chamber where the mix is ignited only once at the start of a lot production. The product from the combustion is then continuously scrubbed mechanically into a downsteam recovery vessel where the BP is separated and recovered. In such an embodiment, the energy required to start the reaction, by igniting a portion of the mixture, would be small in comparison to the total energy released by the continuous, exothermic, and self-sustaining reaction.

Non-limiting embodiments of the invention is further demonstrated in the following examples.

EXAMPLE 1

Ground magnesium powder of about 200 mesh particle size was purchased from Magnesium Elektron Powders, and fine boron phosphate powder, in anhydrous form, was a sample from BassTech International. For BP synthesis, the magnesium and boron phosphate powders were mixed in a container with a mass ratio of 1/1, which is about a 4/1 molar ratio with 10% more magnesium in excess, followed by vigorous shaking and stirring by hand or a blending machine.

Figure 1:
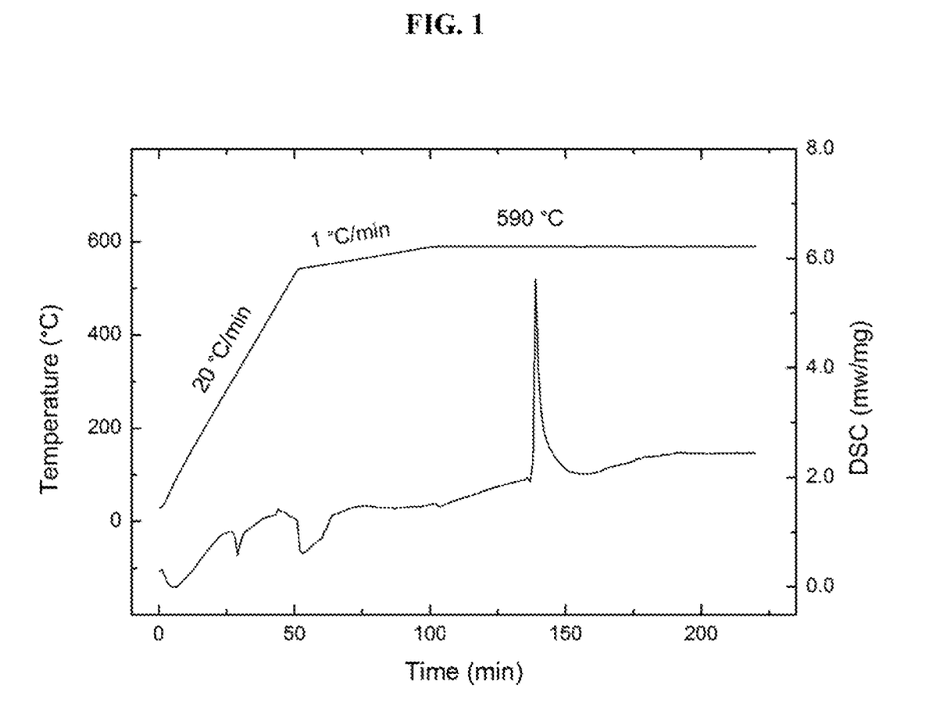
FIG. 1. Heat curve of the powder mixture for BP synthesis upon subjection to a sequence of heating treatment.
Figure 2:
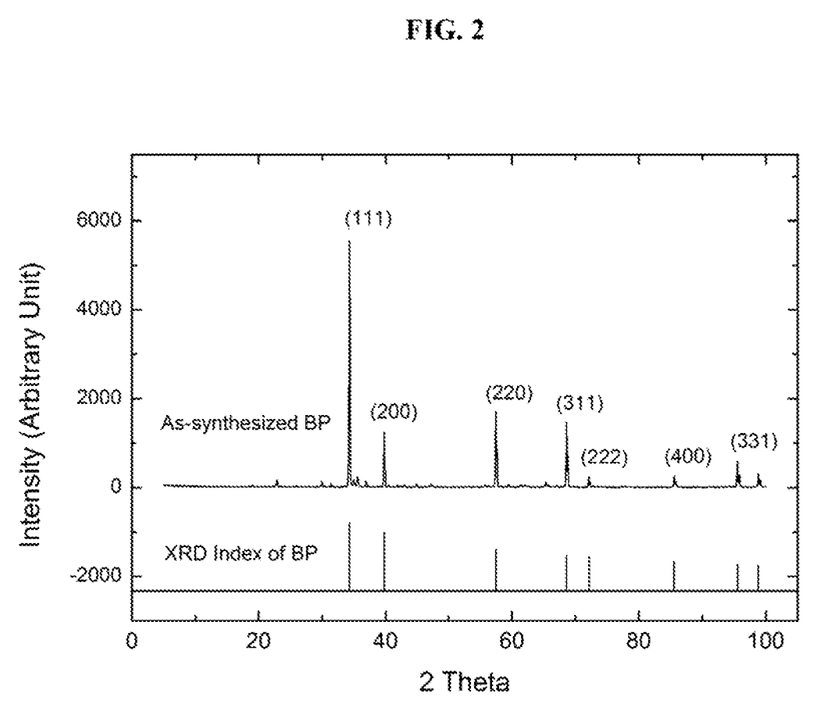
FIG. 2. X-ray diffraction micrographs of the final solid product from the BP synthesis.
Figure 3:
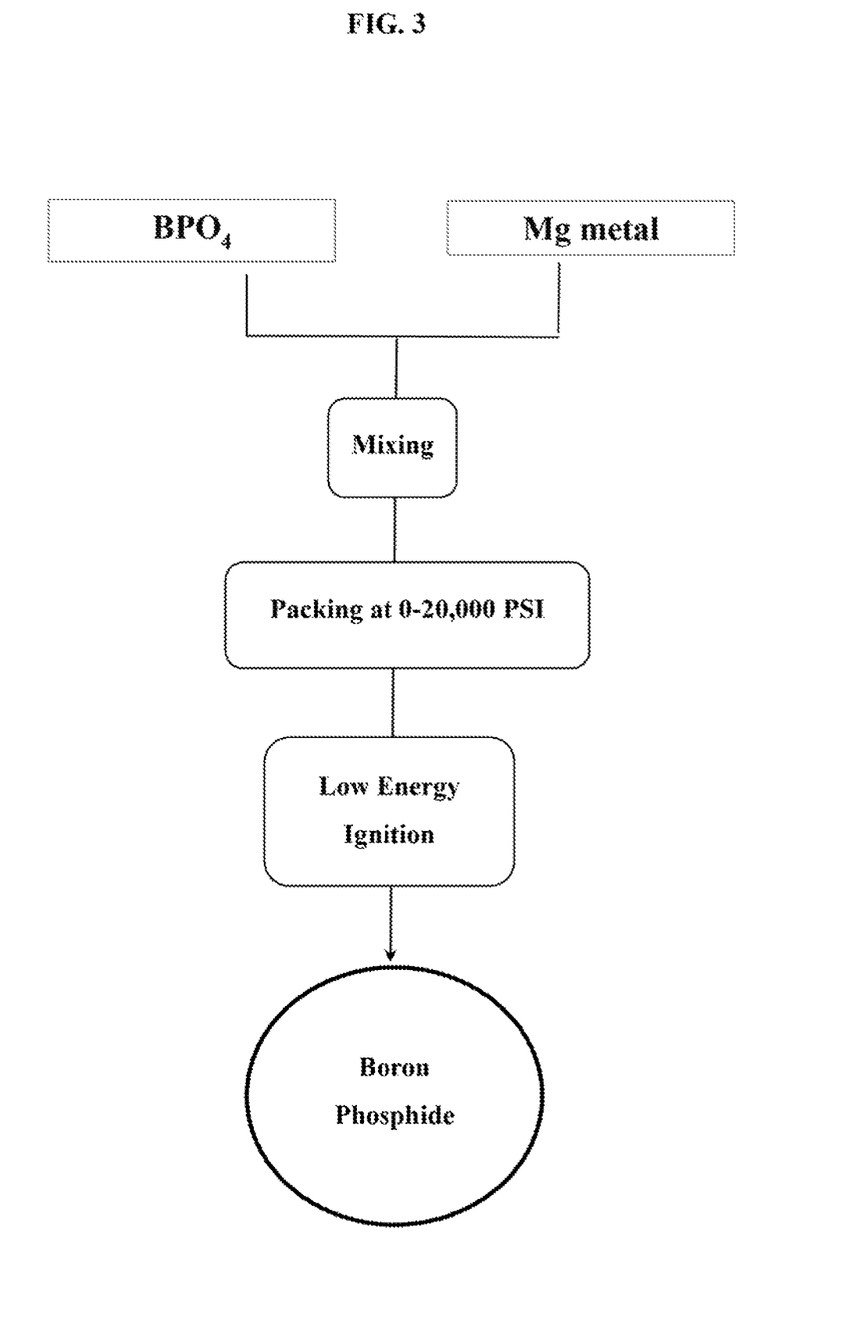
FIG. 3 is a flow chart of the process for synthesizing boron phosphide in high yield as disclosed herein.

In an initial test, a 4.6 mg quantity of the mix was loaded into a ceramic pan in an apparatus for thermal analysis, heated in argon first at a rate of 20° C./min to 540° C., then heated at 1° C./min to 590° C., and then maintained at the final temperature for extended period of time. As can be seen in FIG. 1, a dramatic exothermic event, other than an expected slow thermal process, occurs in the isotherm section of the measurement. The temperature at which the reaction took place is noticeably lower than the melting point of the bulk magnesium metal (649° C.) but comparable with a reduced melting point expected for the fine magnesium powders. The result indicates that the SHS reaction between boron phosphate and magnesium is possibly triggered by the presence of hot magnesium melt. The heat capacity of magnesium metal at 25° C. is about 1.0 J/(g·K) whereas at 590° C. it is 1.3 J/(g·K). If it is assumed that the synthesis mixture has a heat capacity of about 1.3 J/(g·K) or less, it would require at most 735 J/g to heat the mixture from room temperature to 590° C. It would require an additional 175 J/g to melt all of the magnesium in the mixture (the enthalpy of fusion of magnesium is about 350 J/g). Thus, it would require, at most, about 910 J/g (218 cal/g) to ignite the mixture. It is possible to cause ignition using even less energy in configurations where only a portion of the mixture is heated, without significantly preheating the bulk of the mixture, as described in subsequent examples. Even so, the estimated maximum ignition energy that could be required, about 218 cal/g (910 J/g), is small in comparison to the measured heat output of the self-sustaining reaction, which is 1050 cal/g (4393 J/g). The estimated maximum ignition energy in this example, taken as a percentage with respect to the heat output of the reaction, is about 20.7%.

A determination that the minimum energy input should not exceed about 20% or 218 calories/gram is based on the discovery that the heat output from the exothermic reaction between boron phosphate and magnesium metal particles was measured at 1050 cal/g (4393 Ng). This is comparably higher than that of many pyrotechnic mixes, such as commercially available black powder.

A replicate test with the same heating program but a much larger sample size of around 50 g was conducted in a muffle furnace. The exothermic reaction apparently took place once it reached a temperature of close to 590° C., and proceeded rapidly until completion. A portion of the residue was collected for X-ray diffraction analysis, which indicated the presence of crystalline BP and other products. The experiment confirmed again that the auto-ignition temperature of the reactant mixture is approximately 590° C.

EXAMPLE 2

A mixture of fine magnesium and boron phosphate powders was prepared as described in Example 1. A sample of around 11 g was then transferred into a steel cup and mounted into a steel container associated with a Parr 1266 Bomb calorimeter. The container was sealed and pressurized with argon to 450 psi, and the reaction was initiated with an electrically heated fuse wire of 10 cm length. The fuse wire had a correction factor of 2.3 cal/cm (9.6 J/cm), which accounts for the heat of combustion of the fuse wire and, approximately, for the very small amount of electrical energy supplied to heat it. Generally, the electrical energy supplied is small in comparison to the heat of combustion of the fuse wire, allowing one correction factor to be used regardless of the exact amount of electrical energy applied. Upon initiation, a dramatic exothermic event was recorded with a heat output of about an average of 1050 cal/g (4393 J/g). The test was repeated at least 3 times, and the results were consistent as shown in Table 1.

TABLE 1

Heat output of boron phosphate and magnesium powder mix for BP synthesis in comparison with known pyrotechnic formulations.

| Materials | Test Run | Heat output (cal/g) | Average (cal/g) |
|---|---|---|---|
| Mix for BP synthesis | 1 | 1032 | 1050 |
|  | 2 | 1045 |  |
|  | 3 | 1072 |  |
| Black powder | — | — | 718 |

It was found that less than 5 cm of the electrically heated fuse wire was consumed, of which about 1 cm was in direct contact with the mixture. Complete combustion of 5 cm of the wire would have produced about 11.5 cal (48.1 J) of energy, a small amount in comparison to that produced by the exothermic reaction. Although, in these particular experiments, which were conducted under argon pressure, combustion of the wire could only occur with the participation of oxygen produced transiently in the reaction, making complete combustion highly improbable. Combustion of the wire, if it occurred at all, more probably involved only the 1 cm portion in direct contact with the mixture, corresponding to an energy of about 2.3 cal (9.6 J), the other 4 cm having been vaporized by the heat of the reaction. Therefore, the ignition energy in this configuration can be, at the most, about 11.5 cal, and more probably about 2.3 cal or less. In comparison, this corresponds to about 1% or less with respect to the heat output of the reaction, or to about 5% or less with respect to the energy required to heat the entire sample to the ignition temperature and melt all of the magnesium. This indicates that the threshold of the energy input for the initiation of the mix in powder form for BP synthesis is quite low and that the consistency of the heat output in a number of replicate experiments suggests the reaction is self-sustainable to its completion once initiated.

The products of the reaction were recovered with a mass yield close to 100%, and X-ray diffraction analysis indicated the presence of crystalline BP and other products.

EXAMPLE 3

A mixture of fine magnesium and boron phosphate powders was prepared as described in Example 1. A total of 4 g of the mix was pressed in 2 increments into a cardboard tube of 10 mm in inner diameter and 50 mm in length. Tubes were prepared in this way by pressing the mix with pressures ranging from 8,600 to 30,000 psi. A minimum of 3 tubes containing the consolidated mixture were produced at each pressure and one end of each pellet was coated with a thin layer of about 50 mg of A-1A ignition composition, a standard igniter composition with a heat output of around 450 cal/g (1883 J/g), which is equivalent to an energy input of about 22.5 cal (94.1 J) once ignited, in this configuration. The A-1A igniter composition, as described in the military specification MIL-P-22264A, contains zirconium, red iron oxide, and diatomaceous earth in a 65/25/10 weight ratio. In comparison, the thermal energy input of about 22.5 cal for ignition is remarkably small, which amounted to only about 0.54% of the heat output of the reaction, or about 2.59% with respect to the energy required to heat the entire pellet to the ignition temperature and melt all of the magnesium.

Each pellet with an A-1A coating was ignited remotely with an electric match not in direct contact with the pellet, and the test record regarding ignitibility and burning characteristics of those pellets is summarized in Table 2. The pellets were observed and the reaction was analyzed with high-speed video to determine the complete burning of the pellet.

TABLE 2

Ignition and burning characteristics of the pellets of the mix for BP synthesis prepared at varying pressures and ignited via a pyrotechnic pathway.

| Materials | Press pressure (psi) | Test Run | Ignition | Completion |
|---|---|---|---|---|
| Mix for BP synthesis | 8600 | 1 | Yes | Yes |
|  |  | 2 | Yes | Yes |
|  |  | 3 | Yes | Yes |
|  | 17200 | 1 | Yes | No |
|  |  | 2 | Yes | No |
|  | 22631 | 1 | Yes | No |
|  | 28063 | 1 | Yes | No |
|  |  | 2 | No | No |

As can be seen from Table 2, the pellets pressed with higher pressures either failed to be ignited or resulted in incomplete burning. This seems to be due to the higher thermal conductivity of a metallic magnesium column produced at higher pressure, and, therefore, the rapid dispersion of heat throughout the pellet resulting in extinguishment of the exothermic combustion wave.

The products from the pellets prepared with the lowest pressure (8,600 psi) were recovered and characterized by X-ray diffraction analysis as containing very fine BP particles as shown below.

EXAMPLE 4

A large batch of the mix for BP synthesis was prepared as described in Example 1. Large pellets of 87 g were made by pressing the mix with a pressure of about 8,600 psi, in at least 3 increments, into cardboard tubes of 32 mm in inner diameter and 85 mm in length. The pellets were coated with a thin layer of A-1A igniter composition (at least about 50 mg) and ignited remotely with an electric match. The ignition energy was about 0.26 calories per gram of synthesis mixture, as calculated considering 50 mg of igniter composition. In comparison, this thermal energy input for ignition is significantly small, corresponding to only about 0.025% of the heat output from the reaction, or to about 0.12% with respect to the energy required to heat the entire pellet to the ignition temperature and melt all of the magnesium. A violent, but steady and complete burn was observed, and the ashes produced were collected for product analysis and purification. Typically, the ash sample was digested in a sufficient amount of boiling hydrochloric acid solution for at least 6 hours; the solid was then recovered and further washed with distilled water to remove impurities. After being dried at 120° C., a dark-brownish powder was obtained.

Figure 4:
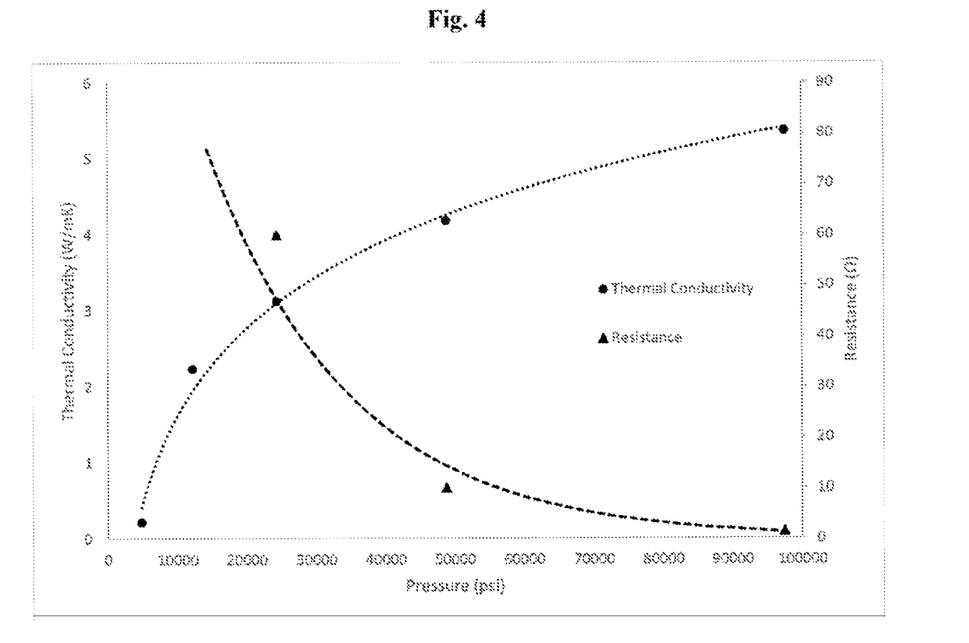
FIG. 4 is a plot illustrating the dependence of thermal conductivity and electric resistance of the pellets of the precursor mix for the BP synthesis on the pressure used to make the pellets.

As shown in FIG. 4, the X-ray diffraction pattern of the solid products show strong lines which can be well-indexed to a crystalline BP phase with face centered cubic cell units, indicating a successful BP synthesis. A further scanning electron microscope (SEM) image, reveals that the as-synthesized BP product is present either as nanoparticles or in a porous morphology with finer nanostructures.

EXAMPLE 5

A mixture of fine magnesium and boron phosphate powders was prepared as described in Example 1. A set of the mix weighted 1 g was pressed with a die of 13 mm in inner diameter at increasing pressure ranging from 4,600 to 100,000 psi. As shown in Table 3 and the corresponding plot illustrated in FIG. 4, a higher pressure led to a higher packing density of a pellet with reduced thickness, but the increase in both thermal and electric conductivity are extraordinary. The results are in full agreement with SHS synthesis tests, shown in Table 2, that the reaction occurs and proceeds to completion only for those pellets pressed at lower pressure and therefore having lower thermal and electric conductivity.

TABLE 3

Physical dimension, thermal conductivity, and electric resistance of the pellets of the precursor mix for BP synthesis which were pressed with increasing pressure*.

| Pressure (psi) | Thickness (mm) | Appearance | Thermal Conductivity** (W/mK) | Electric Resistance*** (Ω) |
|---|---|---|---|---|
| 4876 | 5.3 | Dusty grey | 0.219 | ∞ |
| 12190 | 5.3 | Dusty grey | 2.232 | ∞ |
| 24380 | 4.7 | Metallic silver | 3.124 | 60.0 |
| 48761 | 4.3 | Metallic silver | 4.180 | 10.0 |
| 97521 | 4.0 | Metallic silver | 5.365 | 1.5 |

*All pellets were made from 1.0 g precursor mix with a die of 13 mm in diameter.
**The thermal conductivity through the axis of the pellets was determined with a C-Therm TCi thermal conductivity analyzer. The data set only shows the trend of change but not necessarily an accurate measurement due to lack of a common standard for pellets with vastly different properties.
***The electric resistance between the surface centers of the pellets was measured with a KleinTools MM1000 multimeter.

While embodiments have been set forth as illustrated and described above, it is recognized that numerous variations may be made with respect to the amount of the various constituents in the composition. Therefore, while the invention has been disclosed in various forms only, it will be obvious to those skilled in the art that additions, deletions and modifications can be made without departing from the spirit and scope of this invention, and no undue limits should be imposed, except as to those set forth in the following claims.

What is claimed is:

1. A process for producing high yield crystalline boron phosphide comprising:
   a. mixing a composition consisting essentially of boron phosphate and magnesium metal into a homogenous mixture;
   b. loading the homogenous mixture into a column structure;
   c. packing the homogenous mixture at a pressure of 0 psi to 20,000 psi to form a pellet;
   d. igniting the pellet using a pyrotechnic igniter wherein said pyrotechnic igniter provides an energy input that is no greater than 218 calories/gram of the pellet to initiate a self-propagating high-temperature synthesis reaction of the pellet; and
   c. recovering the crystalline boron phosphide.

2. The process of claim 1, wherein the mass ratio of the magnesium and boron phosphate is about 1:1.

3. The process of claim 1, wherein the pyrotechnic igniter provides an energy input at about 2.3 calories to about 11.5 calories.

4. The process of claim 1, wherein the pyrotechnic igniter provides an energy input is at about 0.025% to about 20% of the heat output of the homogenous mixture.

5. The process of claim 1, wherein the homogenous mixture is packed at a pressure of up to about 10,000 psi.

6. The process of claim 1, wherein the homogenous mixture is packed into a powderous column or self-standing pellet form.

7. The process of claim 1, wherein the column structure consists essentially of a combustible material.

8. The process of claim 1, wherein the column structure comprises a material that can maintain structural integrity of the column structure at temperatures above 1000° C.

9. The process of claim 1, wherein the column structure is a tubular structure comprised of cardboard, ceramic, or steel.

10. The process of claim 1, wherein the homogenous mixture is coated with an ignition composition.

11. The process of claim 1, wherein the homogenous mixture is packed into the column without any pressure.

12. The process of claim 1, wherein the particle size of the magnesium metal is less than 74 microns.

13. The process of claim 1, wherein said pyrotechnic igniter provides an energy input at a rate of 0.9 in/sec to 20 in/sec.

14. A process for increasing the yield of crystalline boron phosphide comprising of:
   a. Mixing a composition comprising boron phosphate and magnesium metal into a homogenous mixture, wherein the mass ratio of boron phosphate and magnesium is about 1:1
   b. loading the homogenous mixture into a column structure;
   c. packing the homogenous mixture at a pressure of 0 psi to 10,000 psi to form a pellet;
   d. igniting the pellet using a pyrotechnic igniter wherein said pyrotechnic igniter provides an energy input that is no greater than 218 calories/gram of the pellet at a rate of 0.9 in/sec to 20 in/sec to the pellet to initiate a self-sustaining high temperature synthesis reaction of the pellet; and
   e. recovering the crystalline boron phosphide.

* * * * *